US 6,635,271 B1

(12) United States Patent
Nurmela et al.

(10) Patent No.: US 6,635,271 B1
(45) Date of Patent: Oct. 21, 2003

(54) METHOD FOR INCREASING THE CONCENTRATION OF CONJUGATED LINOLEIC ACID IN MILK AND/OR TISSUE FAT OF A RUMINANT

(75) Inventors: Kari Nurmela, Helsinki (FI); Mikko Griinari, Espoo (FI)

(73) Assignee: Valio Oy, Helsinki (FI)

( * ) Notice: Subject to any disclaimer, the term of this patent is extended or adjusted under 35 U.S.C. 154(b) by 0 days.

(21) Appl. No.: 09/529,639

(22) PCT Filed: Oct. 20, 1998

(86) PCT No.: PCT/FI98/00815
§ 371 (c)(1),
(2), (4) Date: Jun. 5, 2000

(87) PCT Pub. No.: WO99/20123
PCT Pub. Date: Apr. 29, 1999

(30) Foreign Application Priority Data

Oct. 21, 1997 (FI) .................................. 974017
Apr. 30, 1998 (FI) .................................. 980961

(51) Int. Cl.[7] .................... A61K 47/00; A23K 1/00; A23L 1/20
(52) U.S. Cl. .................... 424/439; 424/442; 426/2; 426/623; 426/630; 426/635
(58) Field of Search ................. 424/439, 442; 426/2, 623, 630, 635

(56) References Cited

U.S. PATENT DOCUMENTS

| 4,073,960 A | 2/1978 | Scott et al. | |
| 5,215,766 A | 6/1993 | Schaub | |
| 5,416,115 A | * 5/1995 | Erdman et al. | 514/560 |
| 5,496,571 A | 3/1996 | Blagdon et al. | |
| 5,547,686 A | 8/1996 | Jenkins | |
| 5,693,358 A | 12/1997 | Park et al. | |
| 5,770,247 A | 6/1998 | Satter et al. | |

FOREIGN PATENT DOCUMENTS

WO 94/16690 8/1994

OTHER PUBLICATIONS

Wonsil et al Dietary and ruminally derived trans–18:1 fatty acids alter bovine milk lipids J Nutr 124: 556–564 1994.*
Stanton et al., "Dietary Influences on Bovine Milk cis–9, trans–11–Conjugated Linoleic Acid Content", Journal of Food Science, vol. 62, No. 5, 1997, pp. 1083–1086.
Precht et al., "Effect of Feeding on conjugated cis ●Δ9, trans Δ11–octadecadienoic acid and other isomers of linoleic acid in bovine milk fats", Nahrung, vol. 41, No. 6, 1997, pp. 330–335.
Pennington et al., "Effects of Intraruminal and Intra–Abomasal Additions of Cod–Liver Oil on Milk Fat Production in the Cow", Journal of Dairy Science, vol. 58, No. 1, 1974, pp. 49–55.
Jiang et al., "Occurrence of Conjugated Cis–9, Trans–11–Octadecadienoic Acid in Bovine Milk: Effects of Feed and Dietary Regimen", Journal of Diary Science, vol. 79, 1996, pp. 438–445.
Ha et al., "Inhibition of Benzo(a)pyrene–induced Mouse Forestomach Neoplasiz by Conjugated Dienoic Derivatives of Linoleic Acid", Cancer Research, vol. 50, 1990, pp. 1097–1101.

(List continued on next page.)

Primary Examiner—Thurman K. Page
Assistant Examiner—Todd D. Ware
(74) Attorney, Agent, or Firm—Burns, Doane, Swecker & Mathis, L.L.P.

(57) ABSTRACT

The invention relates to a method for increasing the concentration of the cis-9, trans-11 isomer of octadecadienoic acid in the milk fat and/or the tissue fat of a ruminant. In the method the ruminant is fed the trans-11 isomer of octadecenoic acid either as such or mixed with other feed, separately or together with other fatty acids.

10 Claims, 3 Drawing Sheets

OTHER PUBLICATIONS

Figure 1:
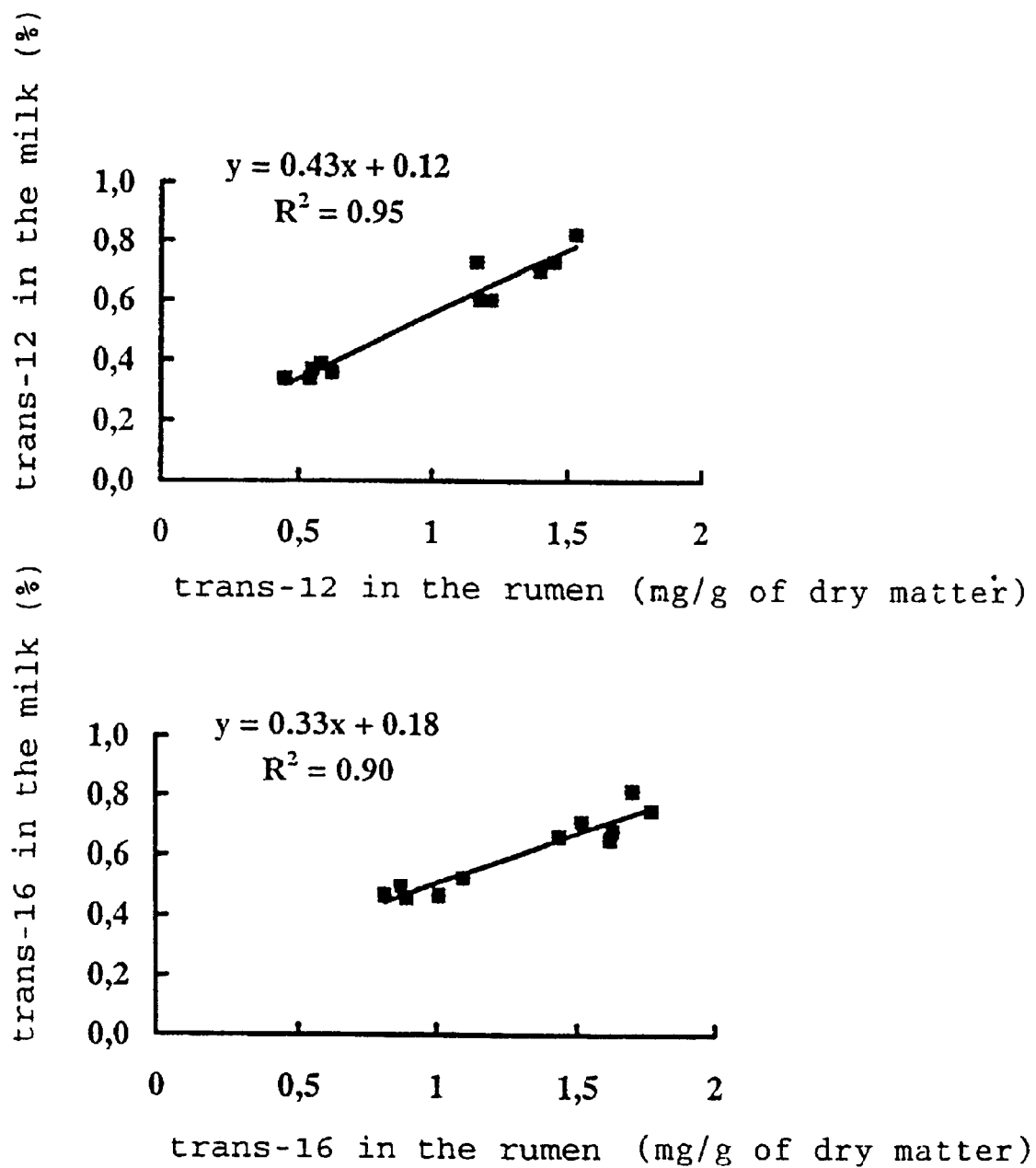

Ip et al., "Conjugated Linoleic Acid", A Powerful Anticarcinogen from animal Fat Sources, Cancer Supplement, vol. 74, No. 3, 1994, pp. 1050–1054.

Scimeca et al., "Effect of Conjugated Linoleic Acid on Carcinogenesis", Diet and Breast Cancer, 1994.

Shultz, et al., "Inhibitory effect of conjugated dienoic derivatives of linoleic acid and β–carotene on the in vitro growth of human cancer cells", Cancer Letters, vol. 63, 1992, pp. 125–133.

Banni et al., "Conjugated Linoleic Acid and Metabolites", Transfatty Acids in Human Nutrition, 1998.

Knekt et al., "Intake of dairy products and the risk of breast cancer", British Journal of Cancer, vol. 73, 1996, pp. 687–691.

Lee et al., "Conjugated linoleic acid and ateroslerosis in rabbits", Atheroslerosis, vol. 108, 1994, pp. 19–25.

Griinari et al., "Trans–Octadecenoic Acids and Milk Fat Depression in Lactating Dairy Cows", Journal of Dairy Science, vol. 81, 1998, vol. 1251–1261.

J. Anim. Sci., vol. 76, Suppl.1/J. Dairy Sci., vol. 81, Suppl.1/ 1998, p. 300.

Kelly et al., "Dietary Fatty Acid Sources Affect Conjugated Linoleic Acid Concentrations in Milk from Lactating Dairy Cows", American Society for Nutritional Sciences, 1993, pp. 881–885.

J. Anim. Sci., vol. 76, Suppl.1/J. Dairy Sci., vol. 81, Suppl.1/ 1998, p. 353.

Kinsella, "Stearly CoA as a Precursor of Oleic Acid and Glycerolipids in Mammary Microsomes From Lactating Bovine: Possible Regulatory Step in Milk Triglyceride Synthesis,", Lipids, vol. 5, 1972.

Mahfouz et al., "Desaturation of Isomeric Trans–Octadecenoic Acids by Rat Liver Microsomes", Biochimica et Biophysica Acta, vol. 618, 1980, pp. 1–12.

Salminen et al., "Dietary trans fatty acids increase conjugated linoleic acid levels in human serum", Nutritional Biochemistry vol. 9, 1998, pp. 93–98.

Harfoot et al., "Lipid Metabolism in the Rumen", The Rumen Microbial Ecosystem, pp. 285–322.

1998 Annual Meeting Abstracts, p. 62.

* cited by examiner

METHOD FOR INCREASING THE CONCENTRATION OF CONJUGATED LINOLEIC ACID IN MILK AND/OR TISSUE FAT OF A RUMINANT

The invention relates to a method for increasing the concentration of conjugated linoleic acid, i.e. chemically precisely expressed the cis-9,trans-11 isomer of octadecadienoic acid (CLA, cis-9,trans-11-C18:2) in the milk fat and/or the tissue fat of a ruminant by feeding to the ruminant, either as such or mixed with other feed, separately or together with other fatty acids, vaccenic acid, i.e. chemically precisely expressed the trans-11 isomer of octadecenoic acid (trans-11-C18:1).

Recently it has been observed that conjugated linoleic acid, i.e. CLA, provides quite effective protection against several forms of cancer (Ha Y. L. et al., Cancer Res. 1990, 50:1097; Ip C. et al., Cancer 1994, 74:1050). It has been observed to be effective against skin and stomach cancers of the mouse and against cancer of the mammary gland of the rat (Scimeca J. A. et al., Diet and Breast Cancer. American Inst. Of Cancer Res. 1994, Plenum Press, London). The growth of human cancer cells has also successfully been inhibited in cell cultures (Shultz T. D. et al., Canc. lett. 1992, 63:125). It has also been observed to have other metabolic effects, some of which clearly suggest effects on health (Banni, S. and J.-C. Martin. 1998. Trans fatty acids in human nutrition. Ed. Sebedio and Christie, The Oily Press, Dundee).

In nature, CLA is present mainly as a component in the tissue fat and the milk fat of ruminants, cis-9,trans-11 being the main isomer (approx. 90%). Small amounts of other isomers are also present in milk, but in the present context, CLA denotes specifically the cis-9,trans-11 isomer.

It is thus an object of the present invention to provide a method suitable for animal husbandry by which the concentration of CLA in the milk fat and/or the tissue fat of a ruminant can be increased. This has been achieved according to the invention in the manner disclosed in the accompanying patent claims.

The method according to the present invention is suitable for all ruminants, in particular for lactating ruminants, such as the cow, whereby it is possible to produce for consumers milk and milk products with a modified fatty acid composition. The change in the fatty acid composition of milk and of milk products is advantageous for the health of consumers. Usually CLA, i.e. cis-9,trans-11-C18:2 fatty acid, constitutes 0.3–0.7% by weight of all of the fatty acids in cow's milk. Even at this concentration it may already protect people consuming milk products from cancer, if the intake of milk fat is sufficiently high (Knekt P. R. et al., Brit. J. of Cancer 1996, 73:687). Habits in the consumption of food fats have changed in recent years. The consumption of fats, and in particular milk fat, has decreased, and as a consequence of this also the intake of CLA in food has decreased. By increasing CLA concentration in milk by amount corresponding to the decrease in the consumption of milk fat it would be possible to return the intake of CLA in food to the level of previous years without needing to increase the consumption of fats. The increasing of the concentration of CLA in milk may thus have a great significance for public health. Increasing the concentration of CLA in milk to a level higher than previously could have an especially positive effect, since in experiments on animals it has been observed that the protective effect of CLA has a clear dose response (Ip C. et al., Cancer 1994, 74:1050). CLA in food may also lower the amount of bad cholesterol (LDL) in the blood (Lee et al. 1994. Atherosclerosis. 108:19). The natural CLA isomer of milk fat has been ingested by people for thousands of years without any observed disadvantages.

The formation of conjugated linoleic acid (cis-9,trans-11-C18:2) during the isomerization of linoleic acid (cis-9,cis-12-C18:2) in the rumen has been described as follows:

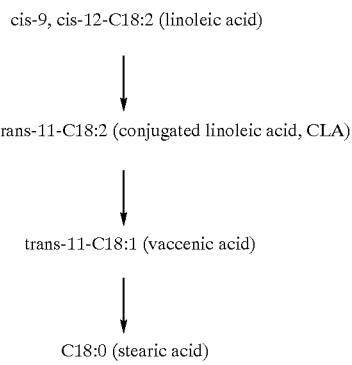

The concentration of CLA in milk has successfully been increased by feeding cows vegetable oils which contain linoleic acid (Griinari J. M. et al., J. Dairy Sci. 1998, 81:1251). Kelly et al. (Kelly M. L. et al., J. Nutr. 1998, 128:881) compared three vegetable oil additions to feed and their effect on milk CLA concentration and observed that the oil addition with the highest concentration of linoleic acid (sunflower oil) gave the best milk CLA response. They noted that the concentration of CLA in milk can be increased by feeding to animals oily fats specifically containing linoleic acid.

It has been believed that the CLA which has passed into milk fat is derived solely from the linoleic acid present in animal feed, i.e. from octadecadienoic acid cis-9,cis-12 isomer, which the microbes of the rumen isomerize to cis-9,trans-11-C18:2 before reducing it to vaccenic acid (trans-11-C18:1) and further to stearic acid (C18:0). CLA is not formed in notable amounts in the hydrogenation of linolenic acid, i.e. the cis-9,cis-12,cis-15-C18:3 isomer of octadecatrienoic acid, but vaccenic acid is also an important biohydrogenation product of linolenic acid (Harfoot and Hazlewood 1988, The rumen microbial ecosystem. Ed. Hobson, P. N. Elsevier Science Publishers B. V., Amsterdam, The Netherlands). According to the prevailing theory, some of the CLA formed as an intermediate product in the biohydrogenation of linoleic acid escapes from the rumen along with the continuous outflow of the rumen fluid before it becomes reduced to vaccenic acid. The CLA which has escaped from the rumen is absorbed mainly in the small intestine, is transferred by the blood circulation to the mammary gland and is bound there as part of the fatty acid composition of milk fat.

The authors of the present invention observed that fish oil, which contains low levels of linoleic acid (composition shown in Table 1), increased the CLA concentration in milk (Table 2).

Table 1 Fatty acid composition of fish oil

| | |
|---|---|
| Myristic acid (14:0) | 8.6 |
| Palmitic acid (16:0) | 18.6 |
| Palmitoleic acid (cis-9-16:1) | 11.9 |
| Stearic acid (18:0) | 3.6 |

-continued

| | |
|---|---|
| Oleic acid (cis-9-18:1) | 9.4 |
| Other cis-acids | 0.9 |
| Cis-Vaccenic acid (cis-11-18:1) | 5.2 |
| Elaidic acid (trans-9-18:1) | 0.2 |
| Linoleic acid (18:2, n-6) | 2.5 |
| Linolenic acid (18:3, n-3) | 1.7 |
| EPA (20:5, n-3) | 10.2 |
| DHA (22:6, n-3) | 7.6 |

TABLE 2

Effect of the feeding of fish oil on the fatty acid composition of milk (% of total fatty acids)

| | No oil addition | Fish oil addition |
|---|---|---|
| C12:0 | 3.4 | 1.9 |
| C14:0 | 12.8 | 9.3 |
| C16:0 | 38.1 | 34.3 |
| C18:0 | 9.7 | 3.8 |
| C18:1 | 26.1 | 28.6 |
| trans-11-C18:1 | 1.1 | 3.2 |
| C18:2 | 2.4 | 2.6 |
| C18:3 | 0.2 | 0.5 |
| CLA | 0.7 | 1.9 |

The generally approved mechanism of CLA formation described above (Harfoot and Hazlewood 1988) also does not explain the increase of the concentration of CLA in the milk when cows receive pasture grass as their only feed (Griinari et al. 1998 J. Dairy Sci. 81 (Suppl. 1):300 (Abst.)), since the principal fatty acid in the fat present in pasture grass is linolenic acid and the proportion of linoleic acid is typically quite low.

Based on observations cited above, the present inventors drew the conclusion that the CLA in milk may also be derived from a source other than the linoleic acid isomerization taking place in the rumen. Furthermore, since in the rumen of a cow feeding on nothing but pasture grass certain CLA isomers (cis-9,trans-11-C18:2 and trans-9,trans-11-C:18:2) were present at an average ratio of 1:1, but in milk the concentration of the cis-9,trans-11-C18:2 isomer was 10 times higher than that of trans-9,trans-11-C:18:2 isomer (Griinari and Numeral, unpublished), the present inventors noted that the CLA of milk fat may in a certain feeding situation be formed to a large extent elsewhere than in the rumen. It has been observed that the above-mentioned CLA isomers transfer from the digestive tract to the milk at almost the same rate, so that what is involved in this situation is not the discrimination of one of the fatty acid isomers (Chouinard et al. 1998. J. Dairy Sci. 81 (Suppl. 1):353 (Abst.)).

Thus the present invention is based on the surprising observation that an oil addition to feed containing low levels of linoleic acid caused a notable increase in the concentration of CLA in the milk. The initial substance of CLA must, however, be formed in the rumen, since CLA is present in considerable amounts in the milk fat and the tissue fat of ruminants only.

Figure 2:
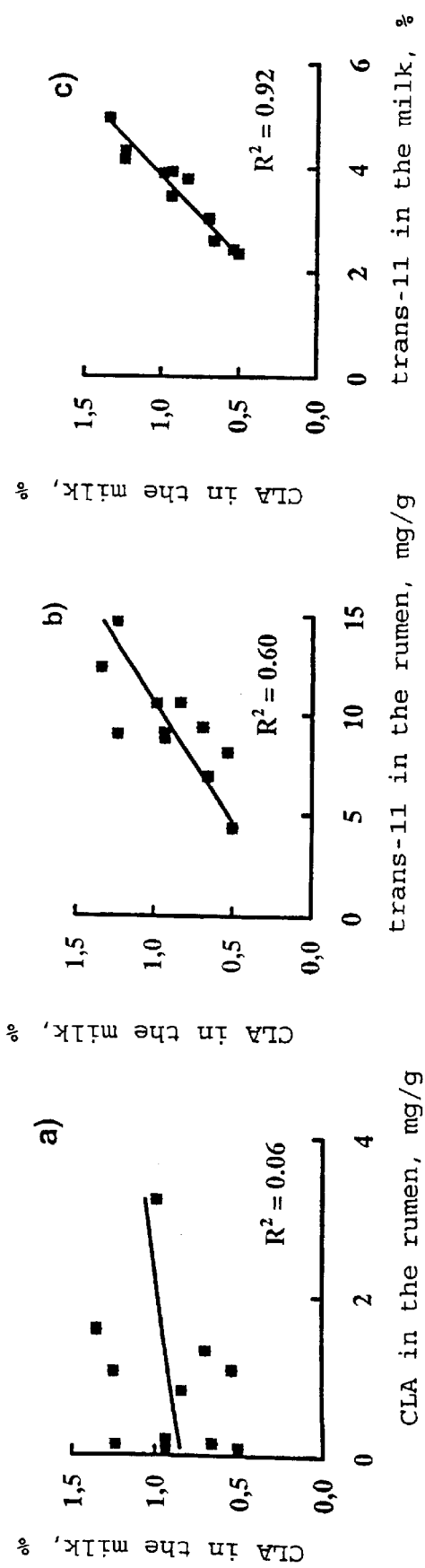

It has also been observed in connection with the present invention that in a cow feeding only on pasture grass the concentration of several trans-fatty acids (i.e. fatty acid isomers formed in the rumen) in the digesta flowing out of the rumen closely predicts the concentrations of these fatty acids in milk (FIG. 1). The close correlation between the concentration in the rumen digesta and the concentration in the milk fat supports the hypothesis of the rumen origin of these fatty acid isomers. As regards CLA, the said correlation is, however, not true (FIG. 2a). The concentration of vaccenic acid (trans-11) in the digested feed flowing out of the rumen in fact explains the variation in the concentration of CLA in the milk considerably better (FIG. 2b). An examination of the relationship of vaccenic acid to CLA in milk fat shows that the correlation is even closer (FIG. 2c). This very close correlation is probably explained as a metabolic substrate (trans-11-C18:1) and product (cis-9,trans-11-C18:2) relationship.

On the basis of the above examination of the correlation and the related conclusion, the surprising observation was made in connection with the present invention that the milk CLA may in certain feeding conditions be formed mainly through the desaturation of vaccenic acid to CLA. The said conversion takes place under the action of the Δ-9 desaturase enzyme in the tissues of the animal, as follows:

Δ-9 desaturase trans-11-C18:1 (vaccenic acid) cis-9,trans-11-C18:2 (CLA)

Thus it is possible that the CLA of milk fat is mainly formed in the tissues of the ruminant as Δ-9 desaturase adds a cis-9 double bond to the trans-11-C18:1 fatty acid which forms in the rumen and escapes from the rumen along with digested feed. Δ-9 desaturase is an active enzyme in a number of different tissues, but its activity has been observed in particular in the cow's mammary gland, where it desaturates stearic acid (C18:0) to oleic acid (cis-9-C18:1) (Kinsella J. E., Lipids 1972, 7:349). On the other hand the microsomal Δ-9 desaturase in the liver cells of the rat has been observed to desaturate trans-11-C18:1 fatty acid to cis-9,trans-11-CLA in vitro (Mahfouz M. M. et al., Biochim. Biophys. Acta 1980, 618:1).

Feeding which increases the formation of vaccenic acid, i.e. trans-11-C18:1 fatty acid, in the rumen may thus, owing to the desaturation of the trans-11-C18:1 fatty acid in the mammary gland or elsewhere in the cow's organism, increase the CLA concentration in the milk. The above-mentioned effect of fish oil increasing the CLA concentration in milk would thus also be explainable by the effect of fish oil on the rumen synthesis of trans-11-C18:1 fatty acid. This is supported by the observation of Pennington and Davis (J. Dairy Sci. 1975. 58:49) on an increased rumen synthesis of vaccenic acid when fish oil was fed to cows. According to the present invention, the increasing of the CLA concentration in milk in certain feeding situations is largely explained by the formation of trans-11-C18:1 fatty acid in the rumen and the desaturation of the said fatty acid to CLA in the organism of the cow, and thus not by the formation of CLA in the rumen as has been believed so far (Harfoot and Hazlewood 1988). The previously described enrichment of the cis-9,trans-11-CLA isomer in milk in proportion to the concentration of the trans-9,trans-11-CLA isomer in pasture-fed cows is explained by the fact that the trans-9,trans-11 isomer cannot be formed in cow tissues, whereas the cis-9,trans-11 isomer could be mainly formed as a product of desaturation. Respectively, with pasture feeding perhaps only a small proportion of the cis-9,trans-11-CLA of the milk is formed in the rumen.

The present invention is based on the increasing of the concentration of CLA in milk fat and tissue fat by feeding the ruminant a fat supplement which contains trans-11-C18:1 fatty acid, i.e. vaccenic acid, i.e. the substrate of the natural Δ-9 desaturase of the organism. Vaccenic acid is converted in the organism, for example in the mammary gland, to cis-9,trans-11-CLA and is secreted to the milk. Similarly, CLA formed in the tissues can be incorporated to tissue lipids.

U.S. Pat. No. 5,416,115 discloses a method by which cow milk fats can be decreased and milk production increased by the use of trans-fatty acids. In the method, for example, a trans-18:1 isomer blend was infused into a cow. However, this publication did not state that the trans-18:1 fatty acid supplement in animal feed would increase the concentration of CLA in the milk fat and the tissue fat.

Food which contains trans-11-C18:1 fatty acid has been found to increase the concentration of cis-9,trans-11 CLA in the blood (Salminen et al. J. Nutr. Biochem. 1998. 9:93) when the diet of the test subjects contained, in a manner deviating from the conventional diet, a very small quantity of polyunsaturated fatty acids. The increase in blood CLA concentration reported by Salminen et al. (1998) shows that the trans-fatty acid desaturation previously observed in liver cells (Mahfouz M. M. et al., Biochim. Biophys. Acta 1980, 618:1) is an active process also in human subjects, but limits it to diets which contain limited amounts of polyunsaturated fatty acids. Santora et al. (1998) (paper presented at the annual meeting of AOCS, Chicago) noted that, when vaccenic acid was fed to mice, their tissue fat CLA concentration tripled. The formation of CLA decreased when the feed of the mice contained 5% corn oil. Corn oil contains large amounts of polyunsaturated fatty acids, i.e. the activity of desaturase is dependent on the degree of unsaturation of the diet.

The present invention shows that a ruminant can be used for the production of the naturally most common CLA isomer for human food by adding vaccenic acid (trans-11-C18:1) to the ruminant's feed. The ruminant is preferably a lactating ruminant, such as a cow, but the invention can also be applied to ruminants intended for meat production.

In the feeding of a ruminant it is advantageous to protect, by known protection methods, the trans-11-C18:1 fat from the effects of rumen biohydrogenation. For example, U.S. Pat. No. 4,642,317 discloses a commonly used method for protecting the fat.

In order to increase the CLA concentration in milk fat it is advantageous to feed vaccenic acid, i.e. trans-11-C18:1 fatty acid, in a mixture which contains large amounts of saturated fatty acids, since the passing of saturated fatty acids to the mammary gland promotes the activity of the mammary gland Δ-9 desaturase and may thereby also promote the conversion of the trans-11 isomer to cis-9,trans-11 CLA.

The most advantageous way of dosing vaccenic acid to animals is to feed it mixed with feed or as a separate feed supplement. The preferable doses of vaccenic acid to be added can be determined by measuring a vaccenic acid amount by which an optimal CLA level is obtained in milk so that the addition is sufficiently economical in terms of costs.

The invention is illustrated below with the help of examples.

EXAMPLE 1

The purpose of the experiment was to show that trans-11-C18:1 dosed to lactating cows post ruminally into the digestive tract was converted to cis-9,trans-11-CLA in the tissues. The experiment was carried out by administering fat-free milk (carrier, 5 kg/d) to the cows by continuous infusion into the abomasum for three days (Preliminary Period). For the next three days (Infusion) 25 g/d of a mixture of trans-11 fatty acid and trans-12-C18:1 fatty acid, emulsified in fat-free milk, was infused into the cows. The concentrations of trans-11-C18:1 and CLA were determined from the milk of the cows on the third day of both the Preliminary Sequence and of the Infusion. The results are shown in accompanying Table 3.

TABLE 3

|  | Preliminary Period | Infusion | % Increase |
|---|---|---|---|
| Milk fatty acid (mg/g of milk fat) |  |  |  |
| trans-11-C18:1 | 12.0 | 14.0 | 17 |
| cis-9, trans-11-C18:2 | 2.8 | 4.1 | 46 |

Figure 3:
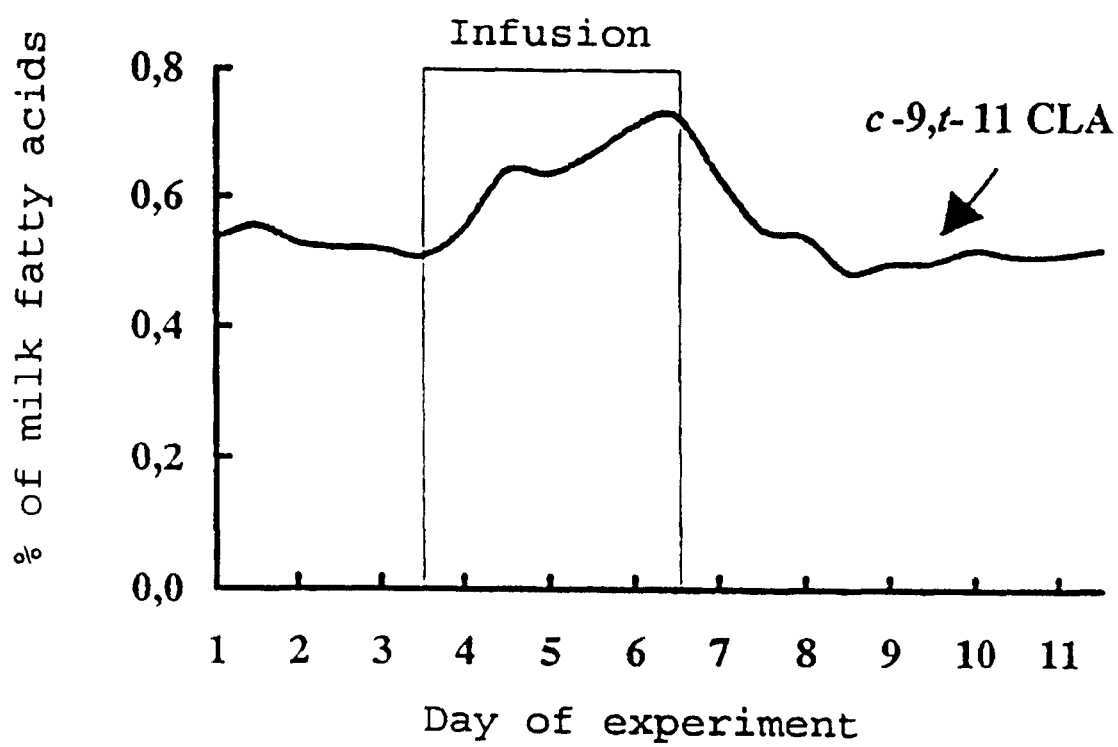

The concentration of trans-11-C18:1 in the milk increased during infusion, showing that the infused fatty acid had been absorbed, had passed into the mammary gland and had become part of the milk fat. The CLA concentration also increased, showing that a significant portion of the trans-11-C18:1 fatty acid received by the animal had been converted in the cow's tissues to CLA. This experiment shows that ruminants, which naturally produce CLA in their body, increase the production of CLA if they receive trans-11-C18:1 fatty acid in an absorbable form, for example added to their feed. Trans-11-C18:1 fatty acid must be dosed into the feed daily, since the CLA concentration in the milk decreases immediately when the feeding is discontinued. In this experiment the CLA concentration in the milk dropped to the basal level in two days after the infusion of the trans-fatty acids had been discontinued (FIG. 3).

EXAMPLE 2

Dairy cows (n=2) were fed a hardened vegetable fat mixture (0, 200 or 400 g/d), which contained 7.9% trans-11-C18:1 fatty acid. The CLA concentration in the milk increased when the feeding of hardened vegetable fats was increased (Table 4). This experiment demonstrates a dose response effect between the dietary intake of trans-11-C18:1 fatty acid and the CLA concentration in the cow's milk.

TABLE 4

|  | Control, 0 g/d | 200 g/d | 400 g/d |
|---|---|---|---|
| In milk fatty acids, % |  |  |  |
| trans-11-C18:1 | 1.2 | 2.1 | 2.6 |
| cis-9, trans-11-C18:2 | 0.5 | 1.0 | 1.4 |

What is claimed is:

1. A method for increasing the concentration of the cis-9,trans-11 isomer of octadecadienoic acid (CLA) in the milk fat and/or the tissue fat of a ruminant, characterized in that the trans-11 isomer of octadecenoic acid is fed to the ruminant in an amount and for a period of time effective to increase the CLA level to above that normally present in the milk fat and/or tissue fat of a ruminant, either as such or mixed with other feed, separately or together with other fatty acids.

2. A method according to claim 1, characterized in that the ruminant is a lactating ruminant.

3. A method according to claim 1 or 2, characterized in that the trans-11 isomer of octadecenoic acid is protected from reduction in the rumen.

4. A method according to claim 1, characterized in that the other fatty acids are saturated fatty acids.

5. A method for increasing the concentration of the cis-9,trans-11 isomer of octadecadienoic acid (CLA) in the milk fat and/or the tissue fat of a ruminant which comprises administering to said ruminant the trans-11 isomer of octadecenoic acid in an amount and for a period of time effective to increase the CLA level to above that normally present in the milk fat and/or tissue fat of a ruminant, optionally mixed with other feed, separately or together with other fatty acids.

6. A method according to claim 5, wherein the ruminant is a lactating ruminant.

7. A method according to claim 6, wherein the trans-11 isomer of octadecenoic acid is protected from reduction in the rumen.

8. A method according to claim 5, wherein the other fatty acids are saturated fatty acids.

9. An animal feed composition for increasing the concentration of the cis-9, trans-11 isomer of octadecadienoic acid (CLA) in the milk fat and/or the tissue fat of a ruminant, the composition comprising the trans-11 isomer of octadecenoic acid present in an amount effective to increase the CLA level to above that normally present in the milk fat and/or tissue fat of a ruminant.

10. An animal feed according to claim 9, additionally containing other fatty acids.

* * * * *